United States Patent
Okabe et al.

(10) Patent No.: US 9,884,226 B2
(45) Date of Patent: Feb. 6, 2018

(54) GOLF BALL

(71) Applicant: DUNLOP SPORTS CO. LTD., Kobe-shi, Hyogo (JP)

(72) Inventors: Satoko Okabe, Kobe (JP); Masatoshi Yokota, Kobe (JP)

(73) Assignee: DUNLOP SPORTS CO. LTD., Kobe-Shi, Hyogo (JP)

( * ) Notice: Subject to any disclaimer, the term of this patent is extended or adjusted under 35 U.S.C. 154(b) by 15 days.

(21) Appl. No.: 14/788,111

(22) Filed: Jun. 30, 2015

(65) Prior Publication Data

US 2015/0375052 A1 Dec. 31, 2015

(30) Foreign Application Priority Data

Jun. 30, 2014 (JP) .................. 2014-135408

(51) Int. Cl.
*A63B 37/02* (2006.01)
*C08L 9/00* (2006.01)
*A63B 37/00* (2006.01)

(52) U.S. Cl.
CPC ...... *A63B 37/0051* (2013.01); *A63B 37/0062* (2013.01); *A63B 37/0063* (2013.01); *A63B 37/0074* (2013.01); *C08L 9/00* (2013.01); *A63B 37/0069* (2013.01)

(58) Field of Classification Search
CPC ............. A63B 37/0051; C08L 23/0869
See application file for complete search history.

(56) References Cited

U.S. PATENT DOCUMENTS

| | | | | |
|---|---|---|---|---|
| 4,769,179 A | * | 9/1988 | Kato | C08K 3/22 252/601 |
| 5,591,803 A | * | 1/1997 | Sullivan | A63B 37/0003 273/DIG. 22 |
| 5,803,834 A | * | 9/1998 | Yamagishi | A63B 37/0004 473/372 |
| 6,277,920 B1 | * | 8/2001 | Nesbitt | A63B 37/0003 473/372 |
| 6,890,992 B2 | * | 5/2005 | Dalton | A63B 37/0003 264/279.1 |
| 2006/0128900 A1 | * | 6/2006 | Nanba | A63B 37/0003 525/261 |
| 2007/0252276 A1 | * | 11/2007 | Lloyd-George | B29C 47/0026 257/750 |
| 2012/0142453 A1 | * | 6/2012 | Mikura | A63B 37/0003 473/372 |
| 2013/0172106 A1 | | 7/2013 | Shinohara | |
| 2013/0172119 A1 | | 7/2013 | Shinohara | |
| 2013/0172120 A1 | | 7/2013 | Shinohara | |

FOREIGN PATENT DOCUMENTS

| | | |
|---|---|---|
| JP | 2013-138855 A | 7/2013 |
| JP | 2013-138856 A | 7/2013 |
| JP | 2013-138857 A | 7/2013 |

OTHER PUBLICATIONS

Vodehnal, Quantitative Analysis of Polybutadienes Using Difference Infrared Spectra, Collection Czechoslov Chem Commun vol. 36 (1971) pp. 4040-4046.*

* cited by examiner

*Primary Examiner* — David J Buttner
(74) *Attorney, Agent, or Firm* — Birch, Stewart, Kolasch & Birch, LLP

(57) ABSTRACT

An object of the present invention is to provide a golf ball excellent in hitting durability. The present invention provides a golf ball comprising a spherical core and at least one cover layer covering the spherical core, wherein at least a part of the spherical core is formed from a rubber composition containing (a) a base rubber, (b) a co-crosslinking agent, (c) a crosslinking initiator, and (x) an olefin-alkyl (meth)acrylate copolymer, and a content of (x) the olefin-alkyl (meth)acrylate copolymer in the rubber composition ranges from 0.5 part by mass to 7.0 parts by mass with respect to 100 parts by mass of (a) the base rubber.

20 Claims, 1 Drawing Sheet

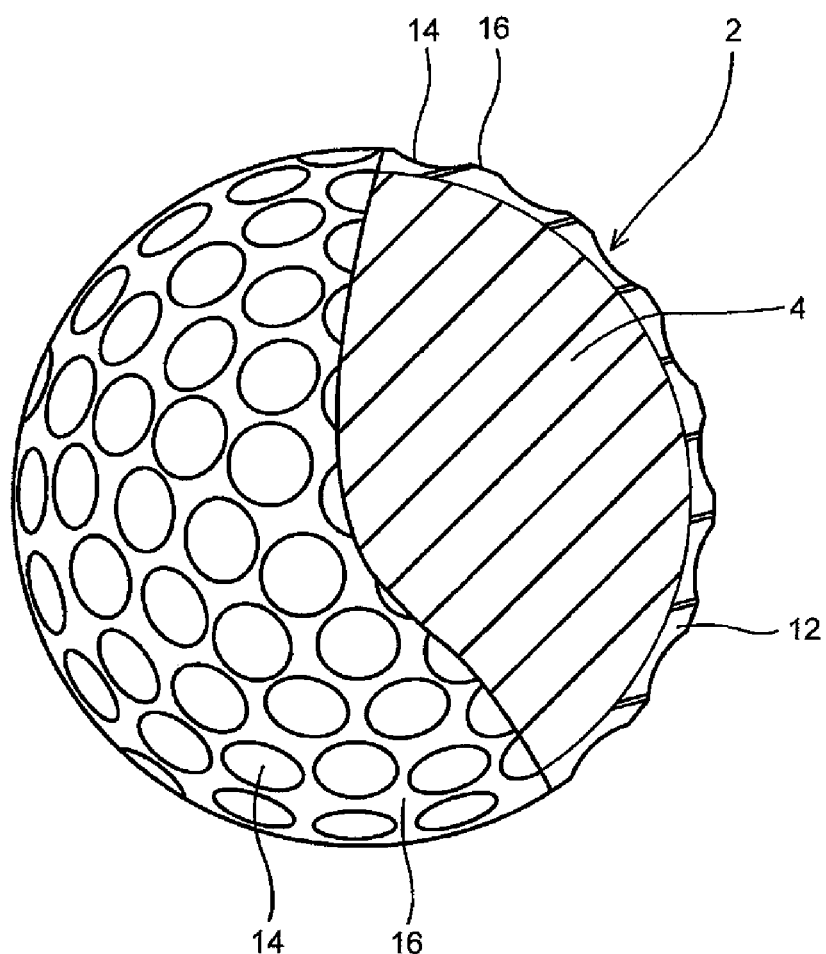

GOLF BALL

FIELD OF THE INVENTION

The present invention relates to a golf ball, in particular, a technology for improving durability of a core.

DESCRIPTION OF THE RELATED ART

Conventionally, a golf ball comprising a spherical core formed from a rubber composition, and a cover covering the spherical core has been proposed. Generally, a golf ball is used repeatedly, thus it is required that the golf ball has crack-resistant durability against hitting. As the method for improving crack-resistant durability of the golf ball, a method of blending a rubber powder into the rubber composition constituting the core has been proposed.

For example, Japanese Patent Publication No. 2013-138855 A, No. 2013-138856 A, and No. 2013-138857 A disclose a solid golf ball having a core of at least one layer and a cover of at least one layer, wherein at least one layer of the core is formed primarily of polybutadiene and includes at least 0.05 part by mass each of (I-a) a rubber powder obtained by granulating a rubber material containing methacrylic acid or a metal salt thereof and/or (I-b) a rubber powder obtained by granulating a rubber material containing acrylic acid or an acrylic acid metal salt, and (II) a polyurethane resin powder with respect to 100 parts by mass of the rubber component of the core, and at least one layer of the cover is formed primarily of polyurethane.

SUMMARY OF THE INVENTION

An object of the present invention is to provide a golf ball excellent in hitting durability.

The present invention provides a golf ball comprising a spherical core and at least one cover layer covering the spherical core, wherein at least a part of the spherical core is formed from a rubber composition containing (a) a base rubber, (b) a co-crosslinking agent, (c) a crosslinking initiator, and (x) an olefin-alkyl (meth)acrylate copolymer, and a content of (x) the olefin-alkyl (meth)acrylate copolymer in the rubber composition ranges from 0.5 part by mass to 7.0 parts by mass with respect to 100 parts by mass of (a) the base rubber.

The present invention provides a golf ball excellent in hitting durability.

BRIEF DESCRIPTION OF THE DRAWINGS

FIG. 1 is a partially cutaway sectional view showing a golf ball according to one embodiment of the present invention.

DESCRIPTION OF THE PREFERRED EMBODIMENT

The present invention provides a golf ball comprising a spherical core and at least one cover layer covering the spherical core, wherein at least a part of the spherical core is formed from a rubber composition containing (a) a base rubber, (b) a co-crosslinking agent, (c) a crosslinking initiator, and (x) an olefin-alkyl (meth)acrylate copolymer, and a content of (x) the olefin-alkyl (meth)acrylate copolymer in the rubber composition ranges from 0.5 part by mass to 7.0 parts by mass with respect to 100 parts by mass of (a) the base rubber.

The golf ball of the present invention comprises a spherical core and at least one cover layer covering the spherical core. At least a part of the spherical core is formed from a core rubber composition containing (a) a base rubber, (b) a co-crosslinking agent, (c) a crosslinking initiator, and (x) an olefin-alkyl (meth)acrylate copolymer. (x) The olefin-alkyl (meth)acrylate copolymer has a low brittleness temperature. By blending (x) the olefin-alkyl (meth)acrylate copolymer, the softness at a low temperature region (high seed region) of the core improves, impact can be absorbed better, thus the impact resistance of the core improves.

As (a) the base rubber, natural rubber and/or synthetic rubber can be used. For example, polybutadiene rubber, natural rubber, polyisoprene rubber, styrene polybutadiene rubber, ethylene-propylene-diene rubber (EPDM), or the like can be used. These rubbers may be used solely, or two or more of these rubbers may be used in combination. Among them, typically preferred is a high cis-polybutadiene having a cis-1,4 bond in a proportion of 40% or more, more preferably 80% or more, and even more preferably 90% or more in view of its superior resilience property.

The high-cis polybutadiene preferably has a 1,2-vinyl bond in a content of 2 mass % or less, more preferably 1.7 mass % or less, and even more preferably 1.5 mass % or less. If the content of 1,2-vinyl bond is excessively high, the resilience may be lowered.

The high-cis polybutadiene preferably includes one synthesized using a rare earth element catalyst. When a neodymium catalyst, which employs a neodymium compound of a lanthanum series rare earth element compound, is used, a polybutadiene rubber having a high content of cis-1,4 bond and a low content of 1,2-vinyl bond is obtained with excellent polymerization activity. Such a polybutadiene rubber is particularly preferred. The high-cis polybutadiene preferably has a Mooney viscosity ($ML_{1+4}(100°$ C.)) of 30 or more, more preferably 32 or more, and even more preferably 35 or more, and preferably has a Mooney viscosity ($ML_{1+4}(100°$ C.)) of 140 or less, more preferably 120 or less, even more preferably 100 or less, and most preferably 80 or less. It is noted that the Mooney viscosity ($ML_{1+4}(100°$ C.)) in the present invention is a value measured according to JIS K6300-1 (2013) using an L rotor under the conditions of: a preheating time of 1 minute; a rotor revolution time of 4 minutes; and a temperature of 100° C.

The high-cis polybutadiene preferably has a molecular weight distribution Mw/Mn (Mw: weight average molecular weight, Mn: number average molecular weight) of 2.0 or more, more preferably 2.2 or more, even more preferably 2.4 or more, and most preferably 2.6 or more, and preferably has a molecular weight distribution Mw/Mn of 6.0 or less, more preferably 5.0 or less, even more preferably 4.0 or less, and most preferably 3.4 or less. If the molecular weight distribution (Mw/Mn) of the high-cis polybutadiene is excessively low, the processability may deteriorate. If the molecular weight distribution (Mw/Mn) of the high-cis polybutadiene is excessively high, the resilience may be lowered. It is noted that the measurement of the molecular weight distribution is conducted by gel permeation chromatography ("HLC-8120GPC", manufactured by Tosoh Corporation) using a differential refractometer as a detector under the conditions of column: GMHHXL (manufactured by Tosoh Corporation), column temperature: 40° C., and mobile phase: tetrahydrofuran, and calculated by converting based on polystyrene standard.

(b) The co-crosslinking agent has an action of crosslinking a rubber molecule by graft polymerization to a base rubber molecular chain. As (b) the co-crosslinking agent, an α,β-unsaturated carboxylic acid having 3 to 8 carbon atoms and/or a metal salt thereof is preferable. The α,β-unsaturated carboxylic acid used as (b) the co-crosslinking agent preferably has 3 to 8 carbon atoms, more preferably has 3 to 6 carbon atoms, even more preferably has 3 to 4 carbon atoms. Examples of the α,β-unsaturated carboxylic acid having 3 to 8 carbon atoms include acrylic acid, methacrylic acid, fumaric acid, maleic acid, crotonic acid, and the like.

Examples of the metal constituting the metal salt of the α,β-unsaturated carboxylic acid having 3 to 8 carbon atoms include: monovalent metal ions such as sodium, potassium, lithium or the like; divalent metal ions such as magnesium, calcium, zinc, barium, cadmium or the like; trivalent metal ions such as aluminum or the like; and other metal ions such as tin, zirconium or the like. The above metal ions can be used solely or as a mixture of at least two of them. Among these metal ions, divalent metal ions such as magnesium, calcium, zinc, barium, cadmium or the like are preferable. Use of the divalent metal salt of the α,β-unsaturated carboxylic acid having 3 to 8 carbon atoms easily generates a metal crosslinking between the rubber molecules. Especially, in light of the better resilience of the resultant golf ball, as the divalent metal salt, the zinc salt of the α,β-unsaturated carboxylic acid having 3 to 8 carbon atoms is preferable, and zinc acrylate is more preferable. The α,β-unsaturated carboxylic acid having 3 to 8 carbon atoms and/or the metal salt thereof may be used solely or in combination at least two of them.

The content of (b) the co-crosslinking agent is preferably 15 parts by mass or more and more preferably 20 parts by mass or more, and is preferably 50 parts by mass or less, more preferably 45 parts by mass or less, and even more preferably 40 parts by mass or less, with respect to 100 parts by mass of (a) the base rubber. If the content of (b) the co-crosslinking agent is less than 15 parts by mass, the content of (c) the crosslinking initiator which will be explained below must be increased in order to obtain the appropriate hardness of the constituting member formed from the core rubber composition, which tends to cause the lower resilience of the golf ball. On the other hand, if the content of (b) the co-crosslinking agent exceeds 50 parts by mass, the constituting member formed from the core rubber composition becomes excessively hard, which tends to cause the lower shot feeling of the golf ball.

(c) The crosslinking initiator is blended in order to crosslink (a) the base rubber component. As (c) the crosslinking initiator, an organic peroxide is preferred. Specific examples of the organic peroxide include organic peroxides such as dicumyl peroxide, 1,1-bis(t-butylperoxy)-3,3,5-trimethylcyclohexane, 2,5-dimethyl-2,5-di(t-butylperoxy)hexane, and di-t-butyl peroxide. These organic peroxides may be used solely, or two or more of these organic peroxides may be used in combination. Among them, dicumyl peroxide is preferably used.

The content of (c) the crosslinking initiator is preferably 0.2 part by mass or more, and more preferably 0.5 part by mass or more, and is preferably 5.0 parts by mass or less, and more preferably 2.5 parts by mass or less, with respect to 100 parts by mass of (a) the base rubber. If the content of (c) the crosslinking initiator is less than 0.2 part by mass, the constituting member formed from the core rubber composition becomes so soft that the golf ball may have the lower resilience. If the content of (c) the crosslinking initiator exceeds 5.0 parts by mass, the amount of (b) the co-crosslinking agent must be decreased in order to obtain the appropriate hardness of the constituting member formed from the core rubber composition, resulting in the insufficient resilience and lower durability of the golf ball.

If the α,β-unsaturated carboxylic acid having 3 to 8 carbon atoms is used as (b) the co-crosslinking agent, the core rubber composition may further contains (d) a metal compound.

(d) The metal compound is not particularly limited as long as it can neutralize (b) the α,β-unsaturated carboxylic acid having 3 to 8 carbon atoms in the rubber composition. (d) The metal compound includes, for example, metal hydroxides such as magnesium hydroxide, zinc hydroxide, calcium hydroxide, sodium hydroxide, lithium hydroxide, potassium hydroxide, copper hydroxide, and the like; metal oxides such as magnesium oxide, calcium oxide, zinc oxide, copper oxide, and the like; metal carbonates such as magnesium carbonate, zinc carbonate, calcium carbonate, sodium carbonate, lithium carbonate, potassium carbonate, and the like. Among these, (d) the metal compound preferably includes a divalent metal compound, more preferably includes a zinc compound. The divalent metal compound reacts with the α,β-unsaturated carboxylic acid having 3 to 8 carbon atoms, thereby forming a metal crosslinking. Use of the zinc compound provides a golf ball with excellent resilience. Use of the zinc compound provides a golf ball with excellent resilience. (d) These metal compounds can be used solely or as a mixture of at least two of them.

(x) The olefin-alkyl (meth)acrylate copolymer is a copolymer of an olefin and a alkyl (meth)acrylate. Examples of the olefin include ethylene and propylene. Examples of (x) the olefin-alkyl (meth)acrylate copolymer include an ethylene-methyl acrylate copolymer, an ethylene-ethyl acrylate copolymer, an ethylene-propyl acrylate copolymer, an ethylene-butyl acrylate copolymer, an ethylene-methyl methacrylate copolymer, an ethylene-ethyl methacrylate copolymer, an ethylene-propyl methacrylate copolymer, and an ethylene-butyl methacrylate copolymer. Among them, as (x) the olefin-alkyl (meth)acrylate copolymer, the ethylene-methyl acrylate copolymer, the ethylene-ethyl acrylate copolymer, and the ethylene-butyl acrylate copolymer are preferable. The ethylene-ethyl acrylate copolymer has a structure in which the ethyl ester residue ($C_2H_5OCO-$) is bonded on the polyethylene main chain. If the ethylene-ethyl acrylate copolymer is used, the impact resistance of the obtained spherical core can be enhanced, the degree of the outer-hard inner-soft structure of the core can be increased, and adhesion between the core surface and a resin layer (such as an intermediate layer, or a cover) formed on the core can be enhanced.

The melt flow rate (2.16 kg, 190° C.) of (x) the olefin-alkyl (meth)acrylate copolymer is preferably 1.0 g/10 min or more, more preferably 5.0 g/10 min or more, and even more preferably 10 g/10 min or more, and is preferably 40 g/10 min or less, more preferably 35 g/10 min or less, and even more preferably 30 g/10 min or less. If the melt flow rate falls within the above range, (x) the olefin-alkyl (meth) acrylate copolymer can be mixed well with the base rubber, and the durability improvement effect is further improved. The melt flow rate of (x) the olefin-alkyl (meth)acrylate copolymer is measured according to JIS K 7210 (1999).

The tensile elastic modulus (−25° C.) of (x) the olefin-alkyl (meth)acrylate copolymer is preferably 20 MPa or more, more preferably 50 MPa or more, and even more preferably 70 MPa or more, and is preferably 500 MPa or less, more preferably 450 MPa or less, and even more preferably 400 MPa or less. If the tensile elastic modulus is 20 MPa or more, the impact resistance of the core is further improved, and if the tensile elastic modulus is 500 MPa or less, the softness of the core becomes higher and durability of the core is enhanced. The tensile elastic modulus of (x) the olefin-alkyl (meth)acrylate copolymer is measured according to JIS K 7162 (1994).

The Vicat softening temperature of (x) the olefin-alkyl (meth)acrylate copolymer is preferably 40° C. or more, more preferably 45° C. or more, and even more preferably 50° C. or more, and is preferably 70° C. or less, more preferably 65° C. or less, and even more preferably 60° C. or less. If the Vicat softening temperature falls within the above range, (x) the olefin-alkyl (meth)acrylate copolymer can be mixed well with the base rubber, and the durability improvement effect is further improved. The Vicat softening temperature of (x) the olefin-alkyl (meth)acrylate copolymer is measured according to JIS K 7206 (1999).

The melting point of (x) the olefin-alkyl (meth)acrylate copolymer is preferably 80° C. or more, more preferably 85° C. or more, and even more preferably 90° C. or more, and is preferably 100° C. or less, more preferably 97° C. or less, and even more preferably 95° C. or less. If the melting point falls within the above range, (x) the olefin-alkyl (meth)acrylate copolymer can be mixed well with the base rubber, and the durability improvement effect is further improved. The melting point of (x) the olefin-alkyl (meth)acrylate copolymer is measured according to JIS K 7121 (1987).

The content of the alkyl (meth)acrylate in (x) the olefin-alkyl (meth)acrylate copolymer is preferably 5.0 mass % or more, more preferably 7.0 mass % or more, and even more preferably 10 mass % or more, and is preferably 35 mass % or less, more preferably 30 mass % or less, and even more preferably 25 mass % or less. If the content of the alkyl (meth)acrylate is 5.0 mass % or more, the impact resistance of the core is enhanced, and if the content of the alkyl (meth)acrylate is 35 mass % or less, the compatibility between (x) the olefin-alkyl (meth)acrylate copolymer and the base rubber becomes high, and the durability improvement effect becomes larger.

The brittleness temperature of (x) the olefin-alkyl (meth) acrylate copolymer is preferably −50° C. or less, more preferably −60° C. or less, and even more preferably −70° C. or less. If the brittleness temperature is −50° C. or less, durability at a low temperature (high speed region) is enhanced. The brittleness temperature of (x) the olefin-alkyl (meth)acrylate copolymer is measured according to JIS K 7216 (1980).

SP value (solubility parameter) of the (x) the olefin-alkyl (meth)acrylate copolymer is preferably 7.5 or more, more preferably 8.0 or more, and even more preferably 8.5 or more, and is preferably 11.5 or less, more preferably 10.5 or less, and even more preferably 10.0 or less. If SP value falls within the above range, (x) the olefin-alkyl (meth)acrylate copolymer can be mixed well with the base rubber, and the durability improvement effect is further improved. SP value ($\delta t$) means $\delta t$ defined by the following equations.

$$\delta d = \frac{\sum F_{di}}{V}, \delta p = \frac{\sqrt{\sum F_{pi}^2}}{V}, \delta h = \sqrt{\frac{\sum E_{hi}}{V}}$$

$$\delta_t^2 = \delta_d^2 + \delta_p^2 + \delta_h^2$$

In the equations, V means a volume V (cm$^3$/mole) according to Fedors, and Fdi, Fpi and Ehi are solubility parameter components by the method of Hoftyzer and Van Krevelen. Herein, $\delta d$ is a London dispersion component, $\delta p$ is a dipole moment component, and $\delta h$ is a hydrogen bonding component. The method for calculating SP value is described in "Properties of Polymers, chapter 7 (D. W. VANKREVELEN, Publisher: ELSEVIER, Published year: Third impression 2003)" in detail. It is noted that olybutadiene rubber has SP value of 8.1 to 8.6, and polyisoprene rubber has SP value of 7.9 to 8.4.

The content of (x) the olefin-alkyl (meth)acrylate copolymer is 0.5 part by mass or more, and preferably 1.0 part by mass or more, and is 7.0 parts by mass or less, preferably 5.0 parts by mass or less, and more preferably 4.0 parts by mass or less. If the content is less than 0.5 part by mass, the impact resistance is lowered, and if the content is more than 7.0 parts by mass, the resilience of the core is lowered.

The core rubber composition may contain (e) a carboxylic acid and/or a salt thereof. By containing (e) the carboxylic acid and/or the salt thereof, the obtained spherical core has a higher degree of the outer-hard inner-soft structure. Examples of (e) the carboxylic acid and/or the salt thereof include an aliphatic carboxylic acid, a salt of an aliphatic carboxylic acid, an aromatic carboxylic acid and a salt of an aromatic carboxylic acid. (e) The carboxylic acid and/or the salt thereof may be used solely or as a mixture of at least two kinds.

As (e) the aliphatic carboxylic acid and/or the salt thereof, a saturated fatty acid and/or a salt thereof are preferable. Caprylic acid (octanoic acid), pelargonic acid (nonanoic acid), capric acid (decanoic acid), lauric acid, myristic acid, palmitic acid, stearic acid, behenic acid, oleic acid, or their potassium salt, magnesium salt, calcium salt, aluminum salt, zinc salt, iron salt, copper salt, nickel salt, and cobalt salt are preferable. As (e) the aromatic carboxylic acid and/or the salt thereof, benzoic acid, butylbenzoic acid, anisic acid (methoxybenzoic acid), dimethoxybenzoic acid, trimethoxybenzoic acid, dimethylaminobenzoic acid, chlorobenzoic acid, dichlorobenzoic acid, trichlorobenzoic acid, acetoxybenzoic acid, biphenylcarboxylic acid, naphthalene carboxylic acid, anthracene carboxylic acid, furan carboxylic acid, thenoic acid, or their potassium salt, magnesium salt, calcium salt, aluminum salt, zinc salt, iron salt, copper salt, nickel salt, and cobalt salt are particularly preferable.

The content of (e) the carboxylic acid and/or the salt thereof, for example, is preferably 0.5 part by mass or more, more preferably 1.0 part by mass or more, and even more preferably 1.5 parts by mass or more, and is preferably 40 parts by mass or less, more preferably 35 parts by mass or less, and even more preferably 30 parts by mass or less, with respect to 100 parts by mass of (a) the base rubber. If the content of (e) the carboxylic acid and/or the salt thereof is 0.5 part by mass or more, the spherical core has a higher degree of the outer-hard inner-soft structure, and if the content of (d) the carboxylic acid and/or the salt thereof is 40 parts by mass or less, the hardness decrease of the core is inhibited and the resilience of the core becomes better.

The core rubber composition preferably further contains (f) an organic sulfur compound. By containing (f) the organic sulfur compound, the obtained spherical core has better resilience. (f) The organic sulfur compound includes, for example, thiophenols, thionaphthols, polysulfides, thiurams, thiocarboxylic acids, dithiocarboxylic acids, sulfenamides, dithiocarbamates, and thiazoles. In light of increasing the hardness distribution of the spherical core, (f) the organic sulfur compound preferably includes an organic sulfur compound having a thiol group (—SH) or a metal salt thereof, and thiophenols, thionaphthols or their metal salts are preferable. (f) These organic sulfur compounds can be used solely or as a mixture of at least two of them.

As (f) the organic sulfur compound, the thiophenols and/or the metal salts thereof, the thionaphthols and/or the metal salts thereof, diphenyldisulfides, and thiuramdisulfides are preferable, 2,4-dichlorothiophenol, 2,6-difluorothiophenol, 2,6-dichlorothiophenol, 2,6-dibromothiophenol, 2,6-diiodothiophenol, 2,4,5-trichlorothiophenol, pentachlorothiophenol, pentabromothiophenol, 1-thionaphthol, 2-thionaphthol, diphenyldisulfide, bis(2,6-difluorophenyl)disulfide, bis(2,6-dichlorophenyl)disulfide, bis(2,6-dibromophenyl)disulfide, bis(2,6-diiodophenyl)disulfide, and bis(pentabromophenyl)disulfide are more preferable.

The content of (f) the organic sulfur compound is preferably 0.05 part by mass or more and more preferably 0.1 part by mass or more, and is preferably 5.0 parts by mass or less and more preferably 2.0 parts by mass or less, with respect to 100 parts by mass of (a) the base rubber. If the content of (f) the organic sulfur compound is 0.05 part by mass or more, the resilience of the resultant golf ball further improves. If the content of (f) the organic sulfur compound is 5.0 parts by mass or less, the compression deformation amount of the obtained golf ball does not become excessively large, thus the resilience decrease is inhibited.

The core rubber composition used in the present invention may further include additives such as a pigment, a filler for adjusting weight or the like, an antioxidant, a peptizing agent, and a softener, where necessary.

Examples of the pigment blended in the core rubber composition include a white pigment, a blue pigment, and a purple pigment. As the white pigment, titanium oxide is preferably used. The type of titanium oxide is not particularly limited, but rutile type is preferably used because of the high opacity. The content of titanium oxide is preferably 0.5 part by mass or more, more preferably 2 parts by mass or more, and is preferably 8 parts by mass or less, more preferably 5 parts by mass or less, with respect to 100 parts by mass of (a) the base rubber.

It is also preferred that the core rubber composition contains both a white pigment and a blue pigment. The blue pigment is blended in order to cause white color to be vivid, and examples thereof include ultramarine blue, cobalt blue, and phthalocyanine blue. Examples of the purple pigment include anthraquinone violet, dioxazine violet, and methyl violet.

The filler blended in the rubber composition is used as a weight adjusting agent for mainly adjusting the weight of the golf ball obtained as a final product. The filler may be blended where necessary. The filler includes inorganic fillers such as barium sulfate, calcium carbonate, magnesium oxide, tungsten powder, molybdenum powder, or the like. The content of the filler is preferably 0.5 part by mass or more and more preferably 1 part by mass or more, and is preferably 30 parts by mass or less, more preferably 25 parts by mass or less, and even more preferably 20 parts by mass or less, with respect to 100 parts by mass of the base rubber. If the content of the filler is less than 0.5 part by mass, it is difficult to adjust the weight, while if the content of the filler exceeds 30 parts by mass, the weight ratio of the rubber component is reduced, thus the resilience tends to be lowered.

The content of the antioxidant is preferably 0.1 part by mass or more and 1 part by mass or less with respect to 100 parts by mass of (a) the base rubber. In addition, the content of the peptizing agent is preferably 0.1 part by mass or more and 5 parts by mass or less with respect to 100 parts by mass of (a) the base rubber.

The core rubber composition used in the present invention is obtained by mixing and kneading (a) the base rubber, (b) the co-crosslinking agent, (c) the crosslinking initiator, (x) the olefin-alkyl (meth)acrylate copolymer, and other additives where necessary. The kneading can be conducted, without any limitation, with a well-known kneading machine such as a kneading roll, abanbury mixer, a kneader, or the like. The kneading temperature (material temperature) is preferably higher than the melting point of (x) the olefin-alkyl (meth)acrylate copolymer and more preferably 100° C. or more, and is preferably 120° C. or less and more preferably 110° C. or less.

The spherical core of the golf ball of the present invention can be obtained by molding the rubber composition after kneaded in a mold. The temperature for molding the rubber composition into the spherical core is preferably 120° C. or more, more preferably 140° C. or more, and even more preferably 150° C. or more, and is preferably 170° C. or less. If the molding temperature exceeds 170° C., the surface hardness of the core tends to decrease. The molding pressure preferably ranges from 2.9 MPa to 11.8 MPa. The molding time preferably ranges from 10 minutes to 60 minutes.

At least a part of the spherical core is formed from the above-described rubber composition. The spherical core may be a single-layered structure or a multiple-layered structure. In the case that the spherical core is a multiple-layered structure, all of layers thereof are formed from a rubber composition, and at least one layer thereof is formed from the rubber composition containing (x) the olefin-alkyl (meth)acrylate copolymer, and it is preferable that all of layers thereof are formed from the rubber composition containing (x) the olefin-alkyl (meth)acrylate copolymer.

The spherical core preferably has a surface hardness (Hs) of 65 or more, more preferably 70 or more, and even more preferably 75 or more in JIS-C hardness. In addition, the spherical core preferably has a surface hardness (Hs) of 95 or less, more preferably 90 or less, and even more preferably 87 or less in JIS-C hardness. If the surface hardness of the spherical core is 65 or more in JIS-C hardness, the spin rate decrease effect on driver shots is obtained, and if the surface hardness of the spherical core is 95 or less in JIS-C hardness, durability of the spherical core is further improved.

The spherical core preferably has a center hardness (Ho) of 35 or more, more preferably 40 or more, and even more preferably 45 or more in JIS-C hardness. In addition, the spherical core preferably has a center hardness (Ho) of 70 or less, more preferably 68 or less, and even more preferably 65 or less in JIS-C hardness. If the center hardness of the spherical core is 35 or more in JIS-C hardness, the spherical core does not become excessively soft, thus good resilience may be obtained. Further, if the center hardness of the spherical core is 70 or less in JIS-C hardness, the spherical core does not become excessively hard, thus good shot feeling may be obtained.

The spherical core preferably has a hardness difference (Hs−Ho) between the surface hardness (Hs) and the center hardness (Ho) of 5.0 or more, more preferably 10 or more, and even more preferably 15 or more in JIS-C hardness, and preferably has a hardness difference (Hs−Ho) of 50 or less, more preferably 45 or less, and even more preferably 40 or less in JIS-C hardness. If the hardness difference between the core surface hardness and the core center hardness is large, a golf ball travelling a great flight distance due to a high launch angle and low spin rate may be obtained.

The spherical core preferably has a diameter of 34.8 mm or more, more preferably 36.8 mm or more, and even more preferably 38.8 mm or more, and preferably has a diameter of 42.2 mm or less, more preferably 41.8 mm or less, even more preferably 41.2 mm or less, and most preferably 40.8 mm or less. If the spherical core has a diameter of 34.8 mm or more, the thickness of the cover does not become excessively thick, thus the resilience becomes better. On the other hand, if the spherical core has a diameter of 42.2 mm or less, the thickness of the cover does not become excessively thin, thus the cover functions better.

When the spherical core has a diameter ranging from 34.8 mm to 42.2 mm, a compression deformation amount (a shrinking amount of the spherical core in the compression direction thereof) of the spherical core when applying a load from an initial load of 98 N to a final load of 1275 N to the spherical core is preferably 2.0 mm or more, more preferably 2.8 mm or more, and is preferably 8.0 mm or less, more preferably 7.0 mm or less, even more preferably 6.0 mm or less, and most preferably 5.0 mm or less. If the compression deformation amount is 2.0 mm or more, the shot feeling becomes better. Further, if the compression deformation amount is 6.0 mm or less, the resilience becomes better.

The golf ball of the present invention comprises at least one cover layer covering the spherical core. The cover may be a single-layered structure or a multiple-layered structure comprising two layers or more, as long as the cover comprises at least one layer.

The golf ball cover of the present invention is formed from a cover composition containing a resin component. Examples of the resin component include, for example, an ionomer resin; a thermoplastic polyurethane elastomer having a commercial name of "Elastollan (registered trademark)" commercially available from BASF Japan Ltd; a thermoplastic polyamide elastomer having a commercial name of "Pebax (registered trademark)" commercially available from Arkema K. K.; a thermoplastic polyester elastomer having a commercial name of "Hytrel (registered trademark)" commercially available from Du Pont-Toray Co., Ltd.; and a thermoplastic styrene elastomer having a commercial name of "Rabalon (registered trademark)" commercially available from Mitsubishi Chemical Corporation; and the like.

The ionomer resin includes a product prepared by neutralizing at least a part of carboxyl groups in a binary copolymer composed of an olefin and an $\alpha,\beta$-unsaturated carboxylic acid having 3 to 8 carbon atoms with a metal ion; a product prepared by neutralizing at least a part of carboxyl groups in a ternary copolymer composed of an olefin, an $\alpha,\beta$-unsaturated carboxylic acid having 3 to 8 carbon atoms, and an $\alpha,\beta$-unsaturated carboxylic acid ester with a metal ion; and a mixture of those. The olefin preferably includes an olefin having 2 to 8 carbon atoms. Examples of the olefin are ethylene, propylene, butene, pentene, hexene, heptene, and octene. The olefin particularly preferably includes ethylene. Examples of the $\alpha,\beta$-unsaturated carboxylic acid having 3 to 8 carbon atoms are acrylic acid, methacrylic acid, fumaric acid, maleic acid and crotonic acid. Among these, acrylic acid and methacrylic acid are particularly preferred. Examples of the $\alpha,\beta$-unsaturated carboxylic acid ester include methyl ester, ethyl ester, propyl ester, n-butyl ester, isobutyl ester of acrylic acid, methacrylic acid, fumaric acid, maleic acid or the like. In particular, acrylic acid ester and methacrylic acid ester are preferable. Among these, the ionomer resin preferably includes the metal ion-neutralized product of the ethylene-(meth) acrylic acid binary copolymer, and the metal ion-neutralized product of the ethylene-(meth) acrylic acid-(meth) acrylic acid ester ternary copolymer.

Specific examples of the ionomer resin include trade name "Himilan (registered trademark) (e.g. Himilan 1555 (Na), Himilan 1557 (Zn), Himilan 1605 (Na), Himilan 1706 (Zn), Himilan 1707 (Na), Himilan AM 3711 (Mg); and the ternary copolymer ionomer resin such as Himilan 1856 (Na) and Himilan 1855 (Zn))" commercially available from Du Pont-Mitsui Polychemicals Co., Ltd.

Further, examples of the ionomer resin commercially available from E.I. du Pont de Nemours and Company include "Surlyn (registered trademark) (e.g. Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), Surlyn AD8546 (Li); and the ternary copolymer ionomer resin such as Surlyn 8120 (Na), Surlyn 8320 (Na), Surlyn 9320 (Zn), Surlyn 6320 (Mg), HPF 1000 (Mg), and HPF 2000 (Mg))"

Further, examples of the ionomer resin commercially available from ExxonMobil Chemical Corporation include "Iotek (registered trademark) (e.g. Iotek 8000 (Na), Iotek 8030 (Na), Iotek 7010 (Zn), Iotek 7030 (Zn); and the ternary copolymer ionomer resin such as Iotek 7510 (Zn) and Iotek 7520 (Zn))".

It is noted that Na, Zn, Li, and Mg described in the parentheses after the trade names of the ionomer resin indicate metal ion type for neutralizing the ionomer resin. The ionomer resin may be used solely or in combination at least two of them.

The cover composition constituting the cover of the golf ball of the present invention preferably includes, as a resin component, an ionomer resin. In the case of using the ionomer resin, it is preferred to use a thermoplastic styrene elastomer in combination. The content of the ionomer resin in the resin component of the cover composition is preferably 50 mass % or more, more preferably 60 mass % or more, and even more preferably 70 mass % or more.

The cover composition may further contain a pigment component such as a white pigment (for example, titanium oxide), a blue pigment, and a red pigment; a weight adjusting agent such as zinc oxide, calcium carbonate, and barium sulfate; a dispersant; an antioxidant; an ultraviolet absorber; a light stabilizer; a fluorescent material or a fluorescent brightener; and the like, as long as they do not impair the performance of the cover, in addition to the above resin component.

The content of the white pigment (for example, titanium oxide) is preferably 0.5 part by mass or more and more preferably 1 part by mass or more, and is preferably 10 parts by mass or less and more preferably 8 parts by mass or less, with respect to 100 parts by mass of the resin component constituting the cover. If the content of the white pigment is 0.5 part by mass or more, it is possible to impart the opacity to the resultant cover. Further, if the content of the white pigment is more than 10 parts by mass, the durability of the resultant cover may deteriorate.

The slab hardness of the cover composition is preferably set in accordance with the desired performance of the golf ball. For example, in case of a so-called distance golf ball which focuses on a flight distance, the cover composition preferably has a slab hardness of 50 or more and more preferably 55 or more, and preferably has a slab hardness of 80 or less and more preferably 70 or less in Shore D hardness. If the cover composition has a slab hardness of 50 or more, the obtained golf ball has a high launch angle and low spin rate on driver shots and iron shots, and thus the flight distance becomes large. If the cover composition has a slab hardness of 80 or less, the golf ball excellent in durability is obtained.

Further, in case of a so-called spin golf ball which focuses on controllability, the cover composition preferably has a slab hardness of less than 50, and preferably has a slab hardness of 20 or more and more preferably 25 or more in Shore D hardness. If the cover composition has a slab hardness of less than 50 in Shore D hardness, the flight distance on driver shots can be improved by the core of the present invention, as well as the obtained golf ball readily stops on the green due to the high spin rate on approach shots. If the cover composition has a slab hardness of 20 or more, the abrasion resistance improves. In case of a plurality of cover layers, the slab hardness of the cover composition constituting each layer can be identical or different, as long as the slab hardness of each layer is within the above range.

An embodiment for molding the cover of the golf ball of the present invention includes, for example, an embodiment which comprises molding the cover composition into a hollow-shell, covering the core with a plurality of the hollow-shells and subjecting the core with a plurality of the hollow shells to the compression-molding (preferably an embodiment which comprises molding the cover composition into a hollow half shell, covering the core with the two hollow half shells, and subjecting the core with the two hollow half shells to the compression-molding); or an embodiment which comprises injection-molding the cover composition directly onto the core.

When molding the cover in a compression-molding method, the molding of the half shell can be performed by either a compression-molding method or an injection-molding method, but the compression-molding method is preferred. The compression-molding of the cover composition into a half shell can be carried out, for example, under a pressure of 1 MPa or more and 20 MPa or less at a molding temperature of −20° C. or more and 70° C. or less relative to the flow beginning temperature of the cover composition. By performing the molding under the above conditions, a half shell having a uniform thickness can be formed. Examples of the method for molding the cover using a half shell include a method of covering the core with the two half shells and then subjecting the core with the two half shells to the compression-molding. The compression-molding of the half shells into the cover can be carried out, for example, under a molding pressure of 0.5 MPa or more and 25 MPa or less at a molding temperature of −20° C. or more and 70° C. or less relative to the flow beginning temperature of the cover composition. By performing the molding under the above conditions, a golf ball cover having a uniform thickness can be formed.

In the case of injection-molding the cover composition into the cover, the cover composition extruded in a pellet form may be used for injection-molding, or the cover materials such as the base resin component and the pigment may be dry blended, followed by directly injection-molding the blended material. It is preferred to use upper and lower molds having a hemispherical cavity and pimples for forming the cover, wherein a part of the pimples also serves as a retractable hold pin. When molding the cover by injection-molding, the hold pin is protruded to hold the core, and the cover composition is charged and then cooled to obtain the cover. For example, the cover composition which has been heated to a temperature ranging from 200° C. to 250° C. is charged into a mold held under a pressure of 9 MPa to 15 MPa for 0.5 second to 5 seconds, and after cooling for 10 seconds to 60 seconds, the mold is opened to obtain the golf ball with the cover.

The concave portions called "dimple" are usually formed on the surface of the cover. The total number of the dimples is preferably 200 or more and 500 or less. If the total number of the dimples is less than 200, the dimple effect is hardly obtained. On the other hand, if the total number of the dimples exceeds 500, the dimple effect is hardly obtained because the size of the respective dimples is small. The shape (shape in a plan view) of the dimples includes, for example, without limitation, a circle, a polygonal shape such as a roughly triangular shape, a roughly quadrangular shape, a roughly pentagonal shape, a roughly hexagonal shape, and another irregular shape. The shape of the dimples may be employed solely or at least two of them may be used in combination.

The thickness of the cover is preferably 4.0 mm or less, more preferably 3.0 mm or less, and even more preferably 2.0 mm or less. If the thickness of the cover is 4.0 mm or less, the resilience and the shot feeling of the obtained golf ball become better. The thickness of the cover is preferably 0.3 mm or more, more preferably 0.5 mm or more, even more preferably 0.8 mm or more, and most preferably 1.0 mm or more. If the thickness of the cover is less than 0.3 mm, the durability and the wear resistance of the cover may deteriorate. If the cover has a plurality of layers, it is preferred that the total thickness of the cover layers falls within the above range.

The golf body on which the cover has been molded is ejected from the mold, and as necessary, the golf ball body is preferably subjected to surface treatments such as deburring, cleaning, and sandblast. If desired, a paint film or a mark may be formed thereon. The paint film preferably has a thickness of, but not limited to, 5 μm or larger, and more preferably 7 μm or larger, and preferably has a thickness of 50 μm or smaller, more preferably 40 μm or smaller, and even more preferably 30 μm or smaller. If the thickness of the paint film is smaller than 5 μm, the paint film is easy to wear off due to continued use of the golf ball, and if the thickness of the paint film is larger than 50 μm, the effect of the dimples is reduced, resulting in lowering flying performance of the golf ball.

When the golf ball of the present invention has a diameter in a range from 40 mm to 45 mm, a compression deformation amount (a shrinking amount of the golf ball in the compression direction thereof) of the golf ball when applying a load from an initial load of 98 N to a final load of 1275 N to the golf ball is preferably 2.0 mm or more, more preferably 2.4 mm or more, even more preferably 2.5 mm or more, and most preferably 2.8 mm or more, and is preferably 6.0 mm or less, more preferably 5.5 mm or less, even more preferably 5.0 mm or less, and most preferably 4.5 mm or less. If the compression deformation amount is 2.0 mm or more, the golf ball does not become excessively hard, thus exhibits good shot feeling. On the other hand, if the compression deformation amount is 5.0 mm or less, the resilience is enhanced.

The golf ball construction of the present invention is not limited, as long as the golf ball comprises a spherical core and at least one cover layer covering the spherical core. FIG. 1 is a partially cutaway sectional view showing a golf ball 2 according to one embodiment of the present invention. The golf ball 2 comprises a spherical core 4, and a cover 12 covering the spherical core 4. A plurality of dimples 14 are formed on the surface of the cover. Other portions than dimples 14 on the surface of the golf ball 2 are land 16. The golf ball 2 is provided with a paint layer and a mark layer outside the cover 12, but these layers are not depicted.

The golf ball of the present invention includes, for example, a two-piece golf ball comprising a single-layered spherical core and a single-layered cover disposed around the spherical core; a three-piece golf ball comprising a single-layered spherical core and a two-layered cover disposed around the spherical core; a three-piece golf ball comprising a two-layered spherical core and a single-layered cover disposed around the spherical core; a multi-piece golf ball comprising a single-layered spherical core and a three or more-layered cover disposed around the spherical core; a multi-piece golf ball comprising a two-layered spherical core and a two or more-layered cover disposed around the spherical core; and a wound golf ball comprising a spherical core, a rubber thread layer which is formed around the spherical core, and a cover disposed over the rubber thread layer. The present invention can be suitably applied to any one of the above structures.

EXAMPLES

Hereinafter, the present invention will be described in detail by way of examples. The present invention is not limited to the examples described below. Various changes and modifications can be made without departing from the spirit and scope of the present invention.

[Evaluation Methods]

(1) Hardness Distribution of Core (JIS-C Hardness)

A type P1 auto loading durometer manufactured by Kobunshi Keiki Co., Ltd., provided with a JIS-C type spring hardness tester was used to measure the hardness of the core. The JIS-C hardness measured at the core surface was adopted as the surface hardness of the core. The core was cut into two hemispheres to obtain a cut plane, and the hardness at the central point thereof was measured.

(2) Compression Deformation Amount (Mm)

The compression deformation amount of the core (shrinking amount of the core in the compression direction thereof), when applying a load from an initial load of 98 N to a final load of 1275 N to the core, was measured.

(3) Coefficient of Restitution

A 198.4 g of metal cylindrical object was allowed to collide with each core at a speed of 40 m/sec, and the speeds of the cylindrical object and the core before and after the collision were measured. Based on these speeds and the mass of each object, coefficient of restitution for each core was calculated. The measurement was conducted by using twelve samples for each core, and the average value was regarded as coefficient of restitution for the core. Coefficient of restitution of each core is shown as the difference from that of core No. 1.

(4) Slab Hardness (Shore D Hardness)

Sheets with a thickness of about 2 mm were produced by injection molding the cover composition, and stored at 23° C. for two weeks. Three or more of these sheets were stacked on one another so as not to be affected by the measuring substrate on which the sheets were placed, and the hardness of the stack was measured with a type P1 auto loading durometer manufactured by Kobunshi Keiki Co., Ltd., provided with a Shore D type spring hardness tester prescribed in ASTM-D2240.

(5) Durability

An air gun was used to allow ten cores for each core to collide repeatedly with a metal plate at a speed of 50 m/sec. The collision numbers required to break the core were counted, and the average value for ten cores was calculated. The collision numbers for core No. 1 were defined as 100, and durability of each core was represented by converting the collision numbers for each core into this index.

[Production of Golf Ball]

(1) Production of Core

Core No. 1 to 13

The base rubber (polybutadiene rubber) was masticated using a kneader, the ethylene-ethyl acrylate copolymer (EEA) was added into the masticated base rubber according to the formulations shown in Table 1, and the mixture was kneaded (material temperature: 100° C., kneading time: three minutes). Then, the co-crosslinking agent (zinc acrylate), the crosslinking aid (zinc oxide), the filler (barium sulfate), and the crosslinking initiator (dicumyl peroxide) were added according to the formulations shown in Table 1, and kneaded with a kneading roll to produce rubber compositions. The obtained compositions were heat-pressed (170° C., 20 minutes) in upper and lower molds, each having a hemispherical cavity, to produce spherical cores.

TABLE 1

| | Core No. | 1 | 2 | 3 | 4 | 5 | 6 | 7 |
|---|---|---|---|---|---|---|---|---|
| Rubber composition formulation (part by mass) | Polybutadiene rubber | 100 | 99 | 97 | 95 | 90 | 85 | 99 |
| | EEA1 (NUC-6220) | — | 1 | 3 | 5 | 10 | 15 | — |
| | EEA2 (DPDJ-6169) | — | — | — | — | — | — | 1 |
| | EEA3 (NUC-6520) | — | — | — | — | — | — | — |
| | Zinc acrylate | 27 | 27 | 29 | 25 | 25 | 25 | 27 |
| | Barium sulfate | * | * | * | * | * | * | * |
| | Zinc oxide | 3 | 3 | 3 | 3 | 3 | 3 | 3 |
| | Dicumyl peroxide | 0.7 | 0.7 | 0.7 | 0.7 | 0.7 | 0.7 | 0.7 |
| EEA physical property | MFR (g/10 min) | — | 4 | 4 | 4 | 4 | 4 | 6 |
| | Vicat softening temperature (° C.) | — | 70 | 70 | 70 | 70 | 70 | 56 |
| | Melting point (° C.) | — | 97 | 97 | 97 | 97 | 97 | 93 |
| | Content of ethyl acrylate (mass %) | — | 7 | 7 | 7 | 7 | 7 | 18 |
| Core physical property | Mass (g) | 36.69 | 36.71 | 36.68 | 36.76 | 36.65 | 36.66 | 36.67 |
| | Compression deformation amount (mm) | 3.95 | 3.90 | 3.80 | 3.74 | 3.60 | 3.30 | 3.88 |
| | Coefficient of restitution | 0.0000 | −0.0007 | −0.0031 | −0.0051 | −0.0086 | −0.0117 | 0.0003 |
| | Diameter (mm) | 39.90 | 39.90 | 39.90 | 39.90 | 39.90 | 39.90 | 39.90 |
| | Hardness distribution (JIS-C) Center | 63.8 | — | — | 61.1 | 59.5 | — | — |
| | Hardness distribution (JIS-C) Surface | 81.6 | — | — | 82.7 | 83.3 | — | — |
| | Hardness distribution (JIS-C) Hardness difference (surface − center) | 17.8 | — | — | 21.7 | 23.8 | — | — |

TABLE 1-continued

| Evaluation | Durability (index) | | 100 | 115 | 120 | 110 | 100 | 80 | 125 |
|---|---|---|---|---|---|---|---|---|---|

| | | Core No. | 8 | 9 | 10 | 11 | 12 | 13 |
|---|---|---|---|---|---|---|---|---|
| Rubber composition formulation (part by mass) | | Polybutadiene rubber | 97 | 95 | 90 | 85 | 99 | 97 |
| | | EEA1 (NUC-6220) | — | — | — | — | — | — |
| | | EEA2 (DPDJ-6169) | 3 | 5 | 10 | 15 | — | — |
| | | EEA3 (NUC-6520) | — | — | — | — | 1 | 3 |
| | | Zinc acrylate | 29 | 25 | 25 | 25 | 27 | 29 |
| | | Barium sulfate | * | * | * | * | * | * |
| | | Zinc oxide | 3 | 3 | 3 | 3 | 3 | 3 |
| | | Dicumyl peroxide | 0.7 | 0.7 | 0.7 | 0.7 | 0.7 | 0.7 |
| EEA physical property | | MFR (g/10 min) | 6 | 6 | 6 | 6 | 1.6 | 1.6 |
| | | Vicat softening temperature (° C.) | 56 | 56 | 56 | 56 | 56 | 56 |
| | | Melting point (° C.) | 93 | 93 | 93 | 93 | 94 | 94 |
| | | Content of ethyl acrylate (mass %) | 18 | 18 | 18 | 18 | 24 | 24 |
| Core physical property | | Mass (g) | 36.69 | 36.77 | 36.90 | 36.82 | 36.72 | 36.75 |
| | | Compression deformation amount (mm) | 3.80 | 3.80 | 3.62 | 3.33 | 3.91 | 3.83 |
| | | Coefficient of restitution | −0.0030 | −0.0052 | −0.0053 | −0.0087 | −0.0017 | −0.0030 |
| | | Diameter (mm) | 39.90 | 39.90 | 39.90 | 39.90 | 39.90 | 39.90 |
| | Hardness distribution (JIS-C) | Center | — | 59.8 | 64.1 | — | — | — |
| | | Surface | — | 82.2 | 84.2 | — | — | — |
| | | Hardness difference (surface − center) | — | 22.4 | 20.2 | — | — | — |
| Evaluation | | Durability (index) | 130 | 115 | 102 | 85 | 105 | 110 |

* The amount of barium sulfate was adjusted according to the mass of the finally obtained core.

Core No. 14 to 16

The rubber compositions having the formulations shown in Table 2 were kneaded with a kneading roll, and heat-pressed (170° C., 20 minutes) in upper and lower molds, each having a hemispherical cavity, to prepare spherical inner-layer cores.

The base rubber (polybutadiene rubber) was masticated using a kneader, the ethylene-ethyl acrylate copolymer (EEA) was added into the masticated base rubber according to the formulations shown in Table 2, and the mixture was kneaded (material temperature: 100° C., kneading time: three minutes). Then, the co-crosslinking agent (zinc acrylate), the crosslinking aid (zinc oxide), the filler (barium sulfate), and the crosslinking initiator (dicumyl peroxide) were added according to the formulations shown in Table 2, and kneaded with a kneading roll to produce rubber compositions. The obtained compositions were molded into half shells. The molding of the half shells was carried out by charging the rubber composition into each concave portion of the lower mold for molding the half shells, and performing compression. The compression molding was carried out under the conditions of molding temperature: 30° C., molding time: one minute, and molding pressure: 10 MPa. One inner-layer core obtained above was covered with two half shells. The inner-layer core and the half shells were charged into the mold composed of upper and lower molds, each having a hemispherical cavity, and heat-pressed (170° C., 20 minutes) to produce spherical cores.

TABLE 2

| | | | Core No. | | |
|---|---|---|---|---|---|
| | | | 14 | 15 | 16 |
| Inner-layer core | Rubber composition formulation (part by mass) | Polybutadiene rubber | 100 | 100 | 100 |
| | | Zinc acrylate | 25 | 25 | 25 |
| | | Barium sulfate | * | * | * |
| | | Zinc oxide | 5 | 5 | 5 |
| | | Dicumyl peroxide | 0.7 | 0.7 | 0.7 |
| | | Diameter (mm) | 10 | 10 | 10 |
| Outer-layer core | Rubber composition formulation (part by mass) | Polybutadiene rubber | 100 | 99 | 97 |
| | | EEA2 (DPDJ-6169) | — | 1 | 3 |
| | | Zinc acrylate | 35 | 35 | 32 |
| | | Barium sulfate | * | * | * |
| | | Zinc oxide | 3 | 3 | 3 |
| | | Dicumyl peroxide | 0.7 | 0.7 | 0.7 |
| EEA physical property | | MFR (g/10 min) | — | 4 | 4 |
| | | Vicat softening temperature (° C.) | | 70 | 70 |
| | | Melting point (° C.) | — | 97 | 97 |
| | | Content of ethyl acrylate (mass %) | — | 7 | 7 |

TABLE 2-continued

| | | Core No. | | |
|---|---|---|---|---|
| | | 14 | 15 | 16 |
| Core physical property | Mass (g) | 36.71 | 36.75 | 36.75 |
| | Compression deformation amount (mm) | 3.25 | 3.21 | 3.14 |
| | Coefficient of restitution | 0.0000 | −0.0005 | −0.0035 |
| | Diameter (mm) | 39.90 | 39.90 | 39.90 |
| Evaluation | Durability (index) | 100 | 120 | 130 |

* The amount of barium sulfate was adjusted according to the mass of the finally obtained core.

The materials used in Tables 1 and 2 are as follows.
Polybutadiene rubber: "BR730 (high-cis polybutadiene (cis-1,4 bond content=96 mass %, 1,2-vinyl bond content=1.3 mass %, Moony viscosity ($ML_{1+4}$ (100° C.)=55, molecular weight distribution (Mw/Mn)=3))" available from JSR Corporation
EEA1: "NUC-6220 (ethylene-ethyl acrylate copolymer)" (tensile elastic modulus (−25° C.): 70-400 MPa, brittleness temperature: less than −75° C., SP value: 8.6-9.1) available from NUC Corporation
EEA2: "DPDJ-6169 (ethylene-ethyl acrylate copolymer)" (tensile elastic modulus (−25° C.): 250 MPa, brittleness temperature: less than −75° C., SP value: 8.6-9.1) available from NUC Corporation
EEA3: "NUC-6520 (ethylene-ethyl acrylate copolymer)" (tensile elastic modulus (−25° C.): 70-400 MPa, brittleness temperature: less than −75° C., SP value: 8.6-9.1) available from NUC Corporation
Zinc acrylate: "Sanceler (registered trademark) SR" available from Sanshin Chemical Industry Co., Ltd.
Barium sulfate: "Barium sulfate BD" available from Sakai Chemical Industry Co., Ltd. Zinc oxide: "Ginrei R" available from Toho Zinc Co., Ltd.
Dicumyl peroxide: "PERCUMYL (registered trademark) D" available from NOF Corporation (2) Production of Cover Next, the cover material having a formulation shown in Table 3 was extruded with a twin-screw kneading extruder to prepare the cover composition in a pellet form. The extruding conditions of the cover composition were a screw diameter of 45 mm, a screw rotational speed of 200 rpm, and screw UD=35, and the mixture was heated to 150 to 230° C. at the die position of the extruder. The obtained cover composition was injection molded onto the spherical core obtained above to produce the golf ball having the spherical core and the cover layer covering the spherical core.

TABLE 3

| Cover composition | | |
|---|---|---|
| Formulation (parts by mass) | Surlyn 8945 | 50 |
| | Himilan AM 7329 | 50 |
| | Titanium oxide | 4 |
| Slab hardness (Shore D) | | 65 |

As shown in Tables 1 and 2, the cores No. 2-4, 7-9, 12, 13, 15 and 16, in which at least a part of the core was formed from a rubber composition containing (x) an olefin-alkyl (meth)acrylate copolymer in an amount ranging from 0.5 part by mass to 7.0 parts by mass with respect to 100 parts by mass of (a) the base rubber, exhibit excellent durability. On the other hand, the cores No. 5, 6, 10 and 11, which were formed from a rubber composition containing (x) an olefin-alkyl (meth)acrylate copolymer in an amount of more than 7.0 parts by mass with respect to 100 parts by mass of (a) the base rubber, show a small durability improvement effect, or exhibit inferior durability.

In addition, by comparing the cores No. 1, 4 and 9, it is found that if an ethylene-ethyl acrylate copolymer is contained, the degree of the outer-hard inner-soft structure of the core becomes high, thus a spin rate decrease effect on driver shots can be expected.

The golf ball of the present invention has excellent hitting durability. This application is based on Japanese patent application No. 2014-135408 filed on Jun. 30, 2014, the content of which is hereby incorporated by reference.

The invention claimed is:

1. A golf ball comprising a spherical core and at least one cover layer covering the spherical core,
    wherein all of layers of the spherical core are formed from a rubber composition containing (a) a base rubber, (b) a co-crosslinking agent, (c) a crosslinking initiator, and (x) an olefin-alkyl (meth)acrylate copolymer,
    a content of (b) the co-crosslinking agent in the rubber composition ranges from 25 parts by mass to 50 parts by mass with respect to 100 parts by mass of (a) the base rubber, and
    a content of (x) the olefin-alkyl (meth)acrylate copolymer in the rubber composition ranges from 0.5 parts by mass to 7.0 parts by mass with respect to 100 parts by mass of (a) the base rubber.

2. The golf ball according to claim 1, wherein (x) the olefin-alkyl (meth)acrylate copolymer has a melt flow rate (2.16 kg, 190° C.) of 1.0 g/10 min or more and 40 g/10 min or less.

3. The golf ball according to claim 1, wherein (x) the olefin-alkyl (meth)acrylate copolymer has a tensile elastic modulus (−25° C.) of 20 MPa or more and 500 MPa or less.

4. The golf ball according to claim 1, wherein (x) the olefin-alkyl (meth)acrylate copolymer has a Vicat softening temperature of 40° C. or more and 70° C. or less.

5. The golf ball according to claim 1, wherein (x) the olefin-alkyl (meth)acrylate copolymer has a melting point of 80° C. or more and 100° C. or less.

6. The golf ball according to claim 1, wherein (x) the olefin-alkyl (meth)acrylate copolymer has a brittleness temperature of −50° C. or less.

7. The golf ball according to claim 6, wherein (x) the olefin-alkyl (meth)acrylate copolymer has the brittleness temperature of −60° C. or less.

8. The golf ball according to claim 1, wherein (x) the olefin-alkyl (meth)acrylate copolymer is at least one copolymer selected from the group consisting of an ethylene-methyl acrylate copolymer, an ethylene-ethyl acrylate copolymer, and an ethylene-butyl acrylate copolymer.

9. The golf ball according to claim 1, wherein (x) the olefin-alkyl (meth)acrylate copolymer contains the alkyl (meth)acrylate in an amount ranging from 5.0 mass % to 35 mass %.

10. The golf ball according to claim 1, wherein (x) the olefin-alkyl (meth)acrylate copolymer has a solubility parameter ranging from 7.5 to 11.5.

11. The golf ball according to claim 1, wherein the content of (x) the olefin-alkyl (meth)acrylate copolymer in the rubber composition ranges from 1 part by mass to 5 parts by mass with respect to 100 parts by mass of (a) the base rubber.

12. The golf ball according to claim 1, wherein the spherical core has a surface hardness (Hs) ranging from 65 to 95 in JIS-C hardness.

13. The golf ball according to claim 1, wherein the spherical core has a center hardness (Ho) ranging from 35 to 70 in JIS-C hardness.

14. The golf ball according to claim 1, wherein the spherical core has a hardness difference (Hs−Ho) ranging from 5 to 50 in JIS-C hardness between a surface hardness (Hs) and a center hardness (Ho).

15. The golf ball according to claim 1, wherein (a) the base rubber consists of polybutadiene rubber having a 1,2-vinyl bond in a content of 2 mass % or less.

16. The golf ball according to claim 1, wherein the rubber composition further contains (e) a carboxylic acid and/or a salt thereof selected from the group consisting of caprylic acid, pelargonic acid, capric acid, lauric acid, myristic acid, palmitic acid, stearic acid, behenic acid, oleic acid, benzoic acid, butylbenzoic acid, anisic acid, dimethoxybenzoic acid, trimethoxybenzoic acid, dimethylaminobenzoic acid, chlorobenzoic acid, dichlorobenzoic acid, trichlorobenzoic acid, acetoxybenzoic acid, biphenylcarboxylic acid, naphthalene carboxylic acid, anthracene carboxylic acid, furan carboxylic acid, thenoic acid, and a salt thereof.

17. The golf ball according to claim 1, wherein the rubber composition consists essentially of (a) the base rubber, (b) the co-crosslinking agent, (c) the crosslinking initiator, (x) the olefin-alkyl (meth)acrylate copolymer, and at least one inorganic filler selected from the group consisting of barium sulfate, calcium carbonate, magnesium oxide, tungsten powder, and molybdenum powder.

18. The golf ball according to claim 1, wherein
(x) the olefin-alkyl (meth)acrylate copolymer is an ethylene-ethyl acrylate copolymer, and
the spherical core has a surface hardness (Hs) ranging from 65 to 95 in JIS-C hardness, a center hardness (Ho) ranging from 35 to 70 in JIS-C hardness, and a hardness difference (Hs−Ho) ranging from 5 to 50 in JIS-C hardness between the surface hardness (Hs) and the center hardness (Ho).

19. The golf ball according to claim 1, wherein the rubber composition consists essentially of (a) the base rubber, (b) the co-crosslinking agent, (c) the crosslinking initiator, (x) the olefin-alkyl (meth)acrylate copolymer, and at least one inorganic filler selected from the group consisting of barium sulfate, calcium carbonate, magnesium oxide, tungsten powder, and molybdenum powder,
(a) the base rubber consists of polybutadiene rubber having a cis-1,4 bond in a proportion of 80% or more, a 1,2-vinyl bond in a content of 2 mass % or less, and a Mooney viscosity ($ML_{1+4}$(100° C.)) of 55 or more and 140 or less,
(x) the olefin-alkyl (meth)acrylate copolymer is at least one copolymer selected from the group consisting of an ethylene-methyl acrylate copolymer, an ethylene-ethyl acrylate copolymer, and an ethylene-butyl acrylate copolymer,
(x) the olefin-alkyl (meth)acrylate copolymer contains the alkyl (meth)acrylate in an amount ranging from 5.0 mass % to 35 mass %,
(x) the olefin-alkyl (meth)acrylate copolymer has a melt flow rate (2.16 kg, 190° C.) of 1.0 g/10 min or more and 40 g/10 min or less, a tensile elastic modulus (−25° C.) of 20 MPa or more and 500 MPa or less, a Vicat softening temperature of 40° C. or more and 70° C. or less, a melting point of 80° C. or more and 100° C. or less, and a brittleness temperature of −50° C. or less, and
the spherical core has a surface hardness (Hs) ranging from 65 to 95 in JIS-C hardness, a center hardness (Ho) ranging from 35 to 70 in JIS-C hardness, and a hardness difference (Hs−Ho) ranging from 5 to 50 in JIS-C hardness between the surface hardness (Hs) and the center hardness (Ho).

20. The golf ball according to claim 1, wherein (a) the base rubber consists of polybutadiene rubber having a cis-1,4 bond in a proportion of 80% or more and a Mooney viscosity ($ML_{1+4}$(100° C.)) of 55 or more and 140 or less.

* * * * *